US012584636B2

(12) United States Patent
Basso et al.

(10) Patent No.: US 12,584,636 B2
(45) Date of Patent: Mar. 24, 2026

(54) SOL-GEL COATED GLASS CERAMIC INDUCTION COOKTOP

(71) Applicant: WHIRLPOOL CORPORATION, Benton Harbor, MI (US)

(72) Inventors: Margherita Basso, Varese Lombardy (IT); Ermanno Buzzi, Varese Lombardy (IT); Christine Nortey, Milan (IT)

(73) Assignee: Whirlpool Corporation, Benton Harbor, MI (US)

( * ) Notice: Subject to any disclaimer, the term of this patent is extended or adjusted under 35 U.S.C. 154(b) by 163 days.

(21) Appl. No.: 17/989,013

(22) Filed: Nov. 17, 2022

(65) Prior Publication Data

US 2023/0194101 A1 Jun. 22, 2023

Related U.S. Application Data

(60) Provisional application No. 63/291,998, filed on Dec. 21, 2021.

(51) Int. Cl.
*F24C 15/00* (2006.01)
*C03C 17/25* (2006.01)
*C03C 17/30* (2006.01)
*H05B 3/74* (2006.01)

(52) U.S. Cl.
CPC ............ *F24C 15/005* (2013.01); *C03C 17/25* (2013.01); *C03C 17/30* (2013.01); *H05B 3/74* (2013.01); *C03C 2217/77* (2013.01); *C03C 2218/112* (2013.01); *C03C 2218/113* (2013.01); *C03C 2218/33* (2013.01)

(58) Field of Classification Search
CPC ....... F24C 15/005; C03C 17/25; C03C 17/30; H05B 3/74
USPC ......................................................... 428/142
See application file for complete search history.

(56) References Cited

U.S. PATENT DOCUMENTS

| | | | |
|---|---|---|---|
| 9,701,576 B2 | 7/2017 | Bockmeyer et al. | |
| 2015/0037539 A1* | 2/2015 | Knoche ..................... | B05D 7/52 |
| | | | 427/261 |
| 2015/0210586 A1* | 7/2015 | Ehrensperger .......... | C04B 41/46 |
| | | | 428/172 |
| 2017/0183257 A1 | 6/2017 | Apitz et al. | |
| 2017/0233287 A1* | 8/2017 | Li ........................... | C03C 3/089 |
| | | | 428/172 |

(Continued)

FOREIGN PATENT DOCUMENTS

| | | |
|---|---|---|
| DE | 10 2016 216 442 A1 | 1/2018 |
| WO | 2014/091166 A2 | 6/2014 |
| WO | 2017/012968 A1 | 1/2017 |

OTHER PUBLICATIONS

European Search Report for EP 22210973.8 dated May 24, 2023, 7 pages.

*Primary Examiner* — Tahseen Khan
(74) *Attorney, Agent, or Firm* — Brooks Kushman P.C.

(57) ABSTRACT

A cooking appliance with a cooktop includes a glass-ceramic substrate with a top surface for receiving cookware thereon for heating. The surface includes a coating formed by applying a sol-gel coating to the surface after the surface is roughened to increase the surface roughness of the top surface and improve adhesion of the coating thereon. The sol-gel coating forms a matte finish on the cooktop while having anti-stick properties for cleanability.

20 Claims, 2 Drawing Sheets

(56) References Cited

U.S. PATENT DOCUMENTS

2017/0247289 A1    8/2017  Waldschmidt et al.
2022/0144696 A1*  5/2022  Basso  .................. C03C 17/225

* cited by examiner

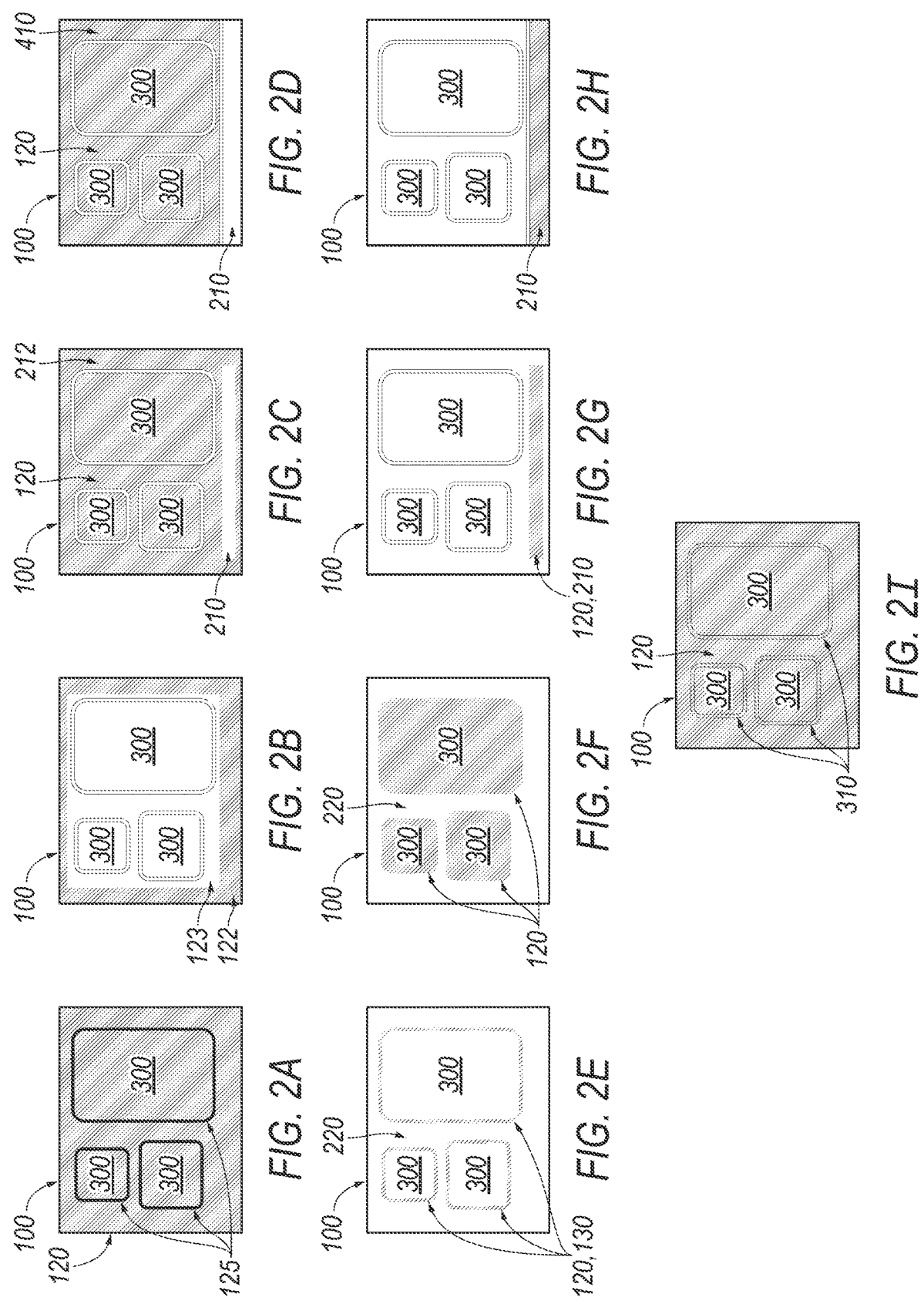

SOL-GEL COATED GLASS CERAMIC INDUCTION COOKTOP

CROSS-REFERENCE TO RELATED APPLICATIONS

This application claims the benefit of U.S. provisional application Ser. No. 63/291,998 filed Dec. 21, 2021, the disclosure of which is hereby incorporated in its entirety by reference herein.

TECHNICAL FIELD

The present application is directed to a coating for a cooking appliance, and more particularly, applying a sol-gel coating on a glass ceramic cooktop of a cooking appliance.

BACKGROUND

Conventional induction cooking appliances, such as induction stoves and cooktops, include a cooktop surface with at least one cooking area defined thereon with an induction element thereunder. The cooktop surface receives cookware on the cooking area for cooking food items therein. Induction cooktops are different from other conventional cooktops because instead of heating up a metal coil that then transfers the heat to the cookware, induction cooktops use the cookware as the heat source for the food therein. Using electromagnetic energy, an induction element beneath the cooktop surface generates heat in the cookware while the surface of the cooktop remains cool and can generates heat more efficiently for cooking food.

The surface of the cooktop to support the cookware typically has a smooth and glossy surface where pots can easily slide thereon and cleaning operations are easy. However, the aesthetic look of a matte surface may be desired as well as minimization of heat reflection offered by matte surfaces, however matte surfaces have an increased surface roughness compared to glossy or high gloss surfaces, which in turn may impact cleanability and sliding on the cooktop.

As such, allowing both functional (usability and cleanability) and aesthetical (matte aesthetic) improvement is desired.

SUMMARY

According to one or more embodiments, a method of forming a cooking appliance includes roughening a top surface of a glass-ceramic substrate and applying a sol-gel coating to the surface. The method may also include masking the surface or laser etching the coated surface to form indicia on the cooktop. The sol-gel coating cures to form a matte finish on the cooktop while having anti-stick properties for cleanability.

According to one or more embodiments, a method of forming a cooking appliance includes, providing a glass-ceramic substrate having a top surface for supporting cookware for heating thereon, processing the top surface to increase a surface roughness of the top surface and form a roughened top surface, applying a sol-gel coating on the roughened top surface, and curing the sol-gel coating to form a matte surface.

According to at least one embodiment, the processing may be sand blasting the top surface. In at least one embodiment, the method may further include masking the top surface of the glass-ceramic substrate such that the sol-gel coating is not applied to masked areas of the top surface. In one or more embodiments, the method may further include laser etching the matte surface to form indicia therein. In at least one embodiment, the applying may be spray coating. According to one or more embodiments, the applying may include applying a plurality of layers of sol-gel coating on the roughened top surface. In at least one embodiment, the curing may be heat curing, UV curing, or curing at room temperature. In one or more embodiments, the sol-gel coating may include one or more metal alkoxides or polymer precursors, and a solvent. In at least one further embodiment, the one or more metal alkoxides or polymer precursors may be silicon-based.

According to one or more embodiments, a method of forming a cooking appliance includes providing a glass-ceramic substrate having a top surface for supporting cookware for heating thereon, masking portions of the top surface to define uncoated portions, processing the top surface to increase a surface roughness of the top surface and form a roughened top surface, applying a sol-gel coating including one or more metal alkoxide or polymer precursors on the roughened top surface, and curing the sol-gel coating to form a matte surface.

According to at least one embodiment, the method may further include removing the masking from the portions to reveal the uncoated portions. In at least one embodiment, the matte surface may have a smoothness greater than the uncoated portions. In one or more embodiments, the curing may be heat curing, UV curing, or curing at room temperature. In at least one embodiment, the one or more metal alkoxide or polymer precursors may be silicon-based. In one or more embodiments, the method may further include laser etching the matte surface to form indicia therein. In at least one embodiment, the applying may be spray coating. In one or more embodiments, the applying may include applying a plurality of layers of sol-gel coating on the roughened top surface. According to at least one embodiment, the masking may be prior to processing such that the uncoated portions have a roughness less than the roughened top surface. In at least one embodiment, the method may further include applying a graphical indicia layer prior to applying the sol-gel coating to form indicia on the top surface.

| According to one or more embodiments, a cooking appliance includes a glass-ceramic substrate having a top surface for supporting cookware for heating thereon, and a bottom surface opposite the top surface, the top surface having a surface roughness greater than the bottom surface and defining at least one uncoated region, and a matte anti-stick coating on the top surface, the matte anti-stick coating having a smoothness greater than a smoothness of the at least one uncoated region.

BRIEF DESCRIPTION OF THE DRAWINGS

FIG. 2A is a schematic top view of a cooktop, according to an embodiment;

FIG. 2B is a schematic top view of a cooktop, according to another embodiment;

FIG. 2C is a schematic top view of a cooktop, according to another embodiment;

FIG. 2D is a schematic top view of a cooktop, according to another embodiment;

FIG. 2E is a schematic top view of a cooktop, according to another embodiment;

FIG. 2F is a schematic top view of a cooktop, according to another embodiment;

FIG. 2G is a schematic top view of a cooktop, according to another embodiment;

FIG. 2H is a schematic top view of a cooktop, according to another embodiment; and FIG. 2I is a schematic top view of a cooktop, according to yet another embodiment.

DETAILED DESCRIPTION

Figure 1:
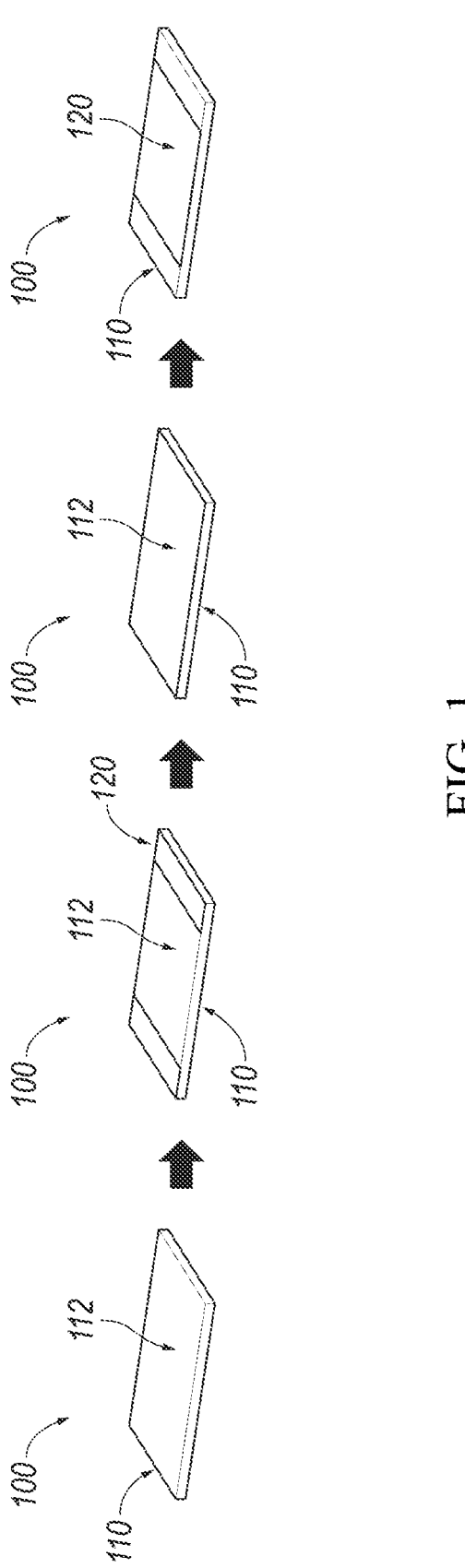
FIG. 1 is a schematic process showing steps for forming a cooking appliance, according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about". Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

Improving usability and cleanability of the coatings while allowing aesthetical variations is desired. Sol-gel coating layers can be used to achieve different aesthetics while maintaining the easy to clean and sliding base properties of glass ceramic (and more in general its functional properties), thereby improving functionality and aesthetic variations in induction cooktops. The application of a sol-gel coating on top of glass ceramic substrate allows for a matte aesthetic design with anti-stick/easy to clean features at the same time.

According to one or more embodiments, a cooking appliance, such as an induction cooktop, includes an induction element beneath the glass-ceramic cooktop. The induction element generates heat in the cookware placed on a surface of the cooktop to cook food items in the cookware. The surface of the cooktop includes a sol-gel coating that has a matte finish that is easy to clean and maintains slidability of cookware thereon. The surface is formed by roughening the glass-ceramic surface to a desired surface roughness, applying a sol-gel coating to the roughened glass-ceramic surface, and curing the sol-gel coating to form an easy to clean and scratch resistant surface with a lower gloss (matte) and more opaque aesthetic.

Referring to FIG. 1, a cooktop 100 of a cooking appliance is shown, according to an embodiment. The cooktop 100 may be of a cooking appliance such as an induction cooktop that includes an induction element (not shown) to heat cookware placed on the cooktop 100.

The cooktop 100 includes a glass-ceramic substrate 110 having a top surface 112 for receiving cookware thereon for cooking food item within the cookware. The glass-ceramic substrate 110 includes a bottom surface 114, opposite of the top surface 112, on the underside of the glass-ceramic substrate 110. The glass-ceramic material may be any suitable material for induction cooktops, including, but not limited to compositions having MgO crystal, or glass matrices like $La_2O_3$—$B_2O_3$—$SiO_2$—MgO. The glass-ceramic substrate 110 may have any suitable thickness for supporting the cookware articles, and in some embodiments, may have a thickness of 2.5 to 8.5 mm, in other embodiments 3 to 8 mm, and in yet other embodiments 3.5 to 7 mm. In certain examples, the glass-ceramic substrate 110 may be 4 mm or 6 mm thick.

The cooktop 100 may further includes a control panel (not shown) for controlling cooking area(s) on the top surface 112 of the glass-ceramic substrate 110. The control panel may be integrated with the surface of the glass-ceramic substrate 110, or the control panel may in other embodiments be separate from the glass-ceramic substrate 110. Furthermore, the control panel may include any suitable mechanism for activating and controlling an induction element below the glass-ceramic substrate 110 in the cooktop 100, such as, but not limited to, control knobs, a digital control panel, push buttons, etc. The control panel is connected to a power supply (not shown), such as a wall outlet. The induction element is also connected to the power supply via the control panel.

The top surface 112 is processed to increase the surface roughness to receive a coating 120 thereon. The coating 120 improves the easy to clean performance of the cooktop 100 and reduces adhesion of food and may include any suitable number of individual layers of the coating to form the overall coating. Each individual layer may have a thickness of 10 to 50 microns in some embodiments, 12 to 45 microns in other embodiments, and 15 to 40 microns in yet other embodiments. For multi-layer coatings, the overall thickness may be, in some embodiments, for example for two layers, 20 to 80 micron. Additional layers may add additional thickness to the coating per the individual layers included therein. In embodiments where a logo is printed between layers, the overall coating may be up to 100 microns thick. The method of forming the cooktop 100 is now described below with reference to the Figures.

Referring to FIG. 1, the process, in some embodiments, includes masking the glass-ceramic substrate 110 with masking 200. Masking 200 covers areas of the cooktop 100 that are not to be coated, leaving the area to be coated exposed for processing and coating. As such, the masking 200 may be applied in embodiments areas of the ceramic substrate are to be kept with higher smoothness and gloss, as compared with the matte surface. In other embodiments, the masking 200 may be applied, after surface treating and before the coating is applied, to form areas that are sandblasted without the coating being applied onto that. The masking 200 may be applied to achieve a desired aesthetic look, or may leave uncoated areas for receiving other coating layers, details, symbols, or logos.

Referring again to FIG. 1, the application process includes processing the top surface 112 of glass-ceramic substrate 110 to increase the surface roughness and improve coating adhesion on the top surface 112. Generally, the surface roughness may be selected as based on the aesthetic considerations for the matte surface. In some embodiments, the processing of the surface may achieve a surface roughness of 0.2 to 6.0 microns for Ra, in some embodiments, and in further embodiments, 0.4 to 2.5 microns for Ra. When the top surface 112 is roughened, the top surface may have a surface roughness greater than that of an unroughened surface, such as the bottom surface 114. Any suitable roughening process may be used, including, but not limited to, sandblasting, chemical etching, or grinding. In embodiments where the surface is sandblasted, the sandblasting may be done with corundum, silica sand, diamond, or other suitable abrasive material. In embodiments where the surface roughening is by chemical etching, the surface is attacked by a chemical compound resulting in a generally uniform surface roughness via uniform attack on both glass and ceramic particles. In embodiments where the surface processing is via grinding, the grinding paper grit values may be varied to vary surface roughness in areas based on the aesthetic desires for the surface.

Referring again to FIG. 1, a sol-gel coating 120 is then deposited on the roughened surface. In certain embodiments, the roughened surface may be masked again, as will be discussed with respect to the embodiments of FIGS. 2A-I, with the masking preventing coating from being on areas not intended to be coated. Any suitable number of layers of the sol-gel coating 120 may be deposited on the top surface 112 as based on protection desired and matte finish aesthetic desired. Furthermore, in some embodiments a transparent top-coat layer may further be applied. The top-coat layer may improve scratch resistance of the layer(s) of the sol-gel coating 120, and may have sufficient properties to protect serigraphy and symbols printed onto the glass-ceramic substrate 110. In another embodiment, not depicted, the sol-gel coating 120 may be deposited as a protective coating over the top surface 112 such that any graphics may be deposited or otherwise formed thereunder.

The sol-gel coating 120 may be deposited on the roughened top surface 112 in any suitable manner, including, but not limited to spray coating or silk screen/serigraphy, as based on needs (e.g., printing a graphic pattern). The sol-gel coating 120 includes one or more metal alkoxides or polymer precursors, and a solvent. The one or more metal alkoxides or polymer precursors may be, in some embodiments, silicon precursors. The silicon precursors may be, in certain embodiments, in both the form of polymer precursors and alkoxides. The solvent may be, in some embodiments, water, alcohol, or other suitable solvent, or combinations thereof. The sol-gel coating 120 may also include, in some embodiments, a catalyst. The catalyst may be a part of the acid or alkaline compounds families. The catalyst allows control of the reactivity and formation of the macromolecule network for the coating. The catalyst may be any suitable catalyst as based on the desired reactivity. For example, the catalyst may be hydrochloric acid or sodium hydroxide. The reaction of the components undergo a condensation/dehydration reaction that drives the transformation to gel and then the final coating stage for curing. The coating 120 may also include various fillers or pigments to meet desired aesthetics and opacity for the matte surface. Each layer may be a different color, such that the laser etching can reveal a different colored coating thereunder, for example, to form indicia, logos, or other graphical designs. The coating 120 may be a top-coat forming a protective layer for the layers below.

The coating is then cured. The curing phase may take place on each single layer individually, or on the total ply of layers. The curing may be any suitable curing process, such as, for example, heat curing, ultraviolet (UV) curing or normal curing at room temperature. The curing time may be for a predetermined time as based on the coating thickness, layers, or composition. The type of curing may also be selected as based on coating thickness, composition and number of layers (e.g., curing individual layers or curing a single vs. multi-layer).

The sol-gel coating 120 on the roughened surface exhibits easy to clean performances via low adhesion on the coated surface of foods and food residuals through less strong chemical bond interaction between the food and the coating. In certain embodiments, although not shown, the coating 120 may further be engraved, etched (e.g., laser etching), or printed on with indicia, graphics, or symbols. Furthermore, the coating 120 may be used to form the graphics. As shown in FIGS. 2A-I, various patterns can be formed using the masking or laser etching in the coating to coat only certain areas of the cooktop 100 and form graphical patterns or designs on the cooktop 100. The cooktop 100 may also use surface roughening prior to laser etching and printing to form similar designs that can be coated thereafter. Generally, the adhesion of the coating is based on the surface roughening, but additional processing may take place for aesthetic purposes prior to coating.

For example, as shown in FIG. 2A, the sol-gel coating 120 can be applied to form the background of the cooktop 100, with the borders 125 around the cooking areas 300 left uncoated as shown in FIG. 2A to define the areas above the induction elements providing heat for the cooktop, to inform the user where to place cookware on the top surface 112. These areas may be masked during coating, and may include other coatings or pigmented layers disposed on the borders 125 to form the graphic representation of the cooking areas 300.

In the example shown in FIG. 2B, the coating can form a frame 122 around the region 123 that includes cooking areas 300 (with graphical indicia forming the borders of the cooking areas 300) to define the areas above the induction elements providing heat for the cooktop, to inform the user where to place cookware on the top surface 112. The region 123 and cooking areas 300 may be masked such that the coating is applied only to the frame 122.

In the example shown in FIG. 2C, the control panel area 210 of the cooktop 100 can be masked to remain uncoated, while the remaining background area 212 and cooking areas 300 are coated with the sol-gel coating 120. Graphical indicia 214 can be layered over or under, or etched into the sol-gel coating 120 to form borders of the cooking areas 300 to define the areas above the induction elements providing heat for the cooktop, to inform the user where to place cookware on the top surface 112.

In the example shown in FIG. 2D, the cooktop 100 may include different types of glass for different parts of the cooktop 100, and the cooking zone glass may be coated. For example, a first glass 400 is used with a sol-gel coating 120 as background for the cooking areas 300 to define the areas above the induction elements providing heat for the cooktop, to inform the user where to place cookware on the top surface 112. Graphical indicia 410 may be disposed under, over, or etched into the sol-gel coating 120 to form the borders of the cooking areas 300. A second glass 420 may be used to form the control panel area 210, which is uncoated, where the user can activate and/or control the induction elements of the cooktop.

In the examples shown in FIGS. 2E-H, the sol-gel coating 120 can be used in select regions of the cooktop 100. For example, as shown in FIG. 2E, the sol-gel coating 120 may be used to form the graphical borders 130 of the cooking areas 300, to define the areas above the induction elements providing heat for the cooktop, to inform the user where to place cookware on the top surface 112. The cooking areas 300 and the surrounding region 220 may be uncoated by the sol-gel coating 120 by masking or other suitable method.

In the example of FIG. 2F, the sol-gel coating 120 can be used in select regions to form the cooking areas 300, and arranged to illustrate the areas above the induction elements providing heat for the cooktop, to inform the user where to place cookware on the top surface 112. The surrounding region 220 may be uncoated by the sol-gel coating 120 by masking or other suitable method.

In the example of FIG. 2G, the sol-gel coating 120 can be used in select regions such as the control panel area 210 where the user can active and/or control the induction elements of the cooktop, while the rest of the cooktop 100 (including cooking areas 300) remains uncoated by masking or other suitable method.

In the example of FIG. 2H, the sol-gel coating 120 can be used to form a region (such as control panel area 210 where the user can activate and/or control the induction elements) that can match the coating colors of an accompanying appliance, such as an oven.

In the example of FIG. 2I, the sol-gel coating 120 can be applied after the graphic printing forming the borders 310 of the cooking areas 300 on the cooktop 100 with the aim of simultaneously protecting the graphic pattern and adding anti-stick and easy to clean properties to the cooktop 100 and defining the areas above the induction elements providing heat for the cooktop, to inform the user where to place cookware on the top surface 112.

Although the above designs are discussed with respect to masking certain regions, and coating certain regions, and discussion of deposition of layers in a particular order, there may be similar designs formed via laser etching in the surface as based on the layers used to show either an engraved look or other graphical patterns or designs, and other orders of layering as not described herein which are contemplated by the present application.

According to one or more embodiments, a cooking appliance with a cooktop includes a glass-ceramic substrate with a top surface for receiving cookware thereon for heating. The surface includes a coating formed by applying a sol-gel coating to the surface after the surface is roughened to increase the surface roughness of the top surface and improve adhesion of the coating thereon. The surface can be masked during application or the coating can be laser etched to form indicia on the cooktop. The sol-gel coating forms a matte finish on the cooktop while having anti-stick properties for cleanability.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of forming a cooking appliance, comprising:
   providing a glass-ceramic substrate having a top surface for supporting cookware for heating thereon;
   processing at least portions of the top surface to increase a surface roughness of the portions of the top surface as compared with adjacent non-roughened portions of the top surface, and form a roughened portion of the top surface;
   applying a sol-gel coating on at least the roughened top surface; and
   curing the sol-gel coating to form a matte surface at the roughened portion of the top surface, the matte surface having a lower gloss finish and a greater opacity as compared to the adjacent non-roughened portions of the top surface.

2. The method of claim 1, wherein processing is sand blasting the top surface.

3. The method of claim 1, further comprising masking the top surface of the glass-ceramic substrate such that the sol-gel coating is not applied to masked areas of the top surface.

4. The method of claim 1, further comprising laser etching the matte surface to form indicia therein.

5. The method of claim 1, wherein applying is spray coating.

6. The method of claim 1, wherein applying includes applying a plurality of layers of sol-gel coating on the roughened top surface.

7. The method of claim 1, wherein curing is heat curing, UV curing, or curing at room temperature.

8. The method of claim 1, wherein the sol-gel coating includes one or more metal alkoxides or polymer precursors, and a solvent.

9. The method of claim 8, wherein the one or more metal alkoxides or polymer precursors are silicon-based.

10. A method of forming a cooking appliance comprising:
    providing a glass-ceramic substrate having a top surface for supporting cookware for heating thereon;
    masking portions of the top surface to define uncoated portions adjacent to processing portions;
    processing the processing portions of the top surface to increase a surface roughness of the top surface and form a roughened top surface;
    applying a sol-gel coating including one or more metal alkoxide or polymer precursors on the roughened top surface; and
    curing the sol-gel coating to form a matte surface having a greater opacity and a lower gloss finish than the uncoated portions of the top surface.

11. The method of claim 10, further comprising removing the masking from the portions to reveal the uncoated portions.

12. The method of claim 10, wherein the matte surface has a smoothness greater than the uncoated portions.

13. The method of claim 10, wherein curing is heat curing, UV curing, or curing at room temperature.

14. The method of claim 10, wherein the one or more metal alkoxide or polymer precursors are silicon-based.

15. The method of claim 10, further comprising laser etching the matte surface to form indicia therein.

16. The method of claim 10, wherein applying is spray coating.

17. The method of claim 10, wherein applying includes applying a plurality of layers of sol-gel coating on the roughened top surface.

18. The method of claim 10, wherein the masking is prior to processing such that the uncoated portions have a roughness less than the roughened top surface.

19. The method of claim 10, further comprising applying a graphical indicia layer prior to applying the sol-gel coating to form indicia on the top surface.

20. A cooking appliance comprising:
    a glass-ceramic substrate having a top surface for supporting cookware for heating thereon, and a bottom surface opposite the top surface, the top surface having a surface roughness greater than the bottom surface and defining at least one uncoated region adjacent to a coated region; and
    a matte anti-stick coating on the top surface, the matte anti-stick coating having a smoothness greater than a smoothness of the at least one uncoated region, and the matte anti-stick coating having a greater opacity than the at least one uncoated region of the top surface.

\*　\*　\*　\*　\*